Figure 1:
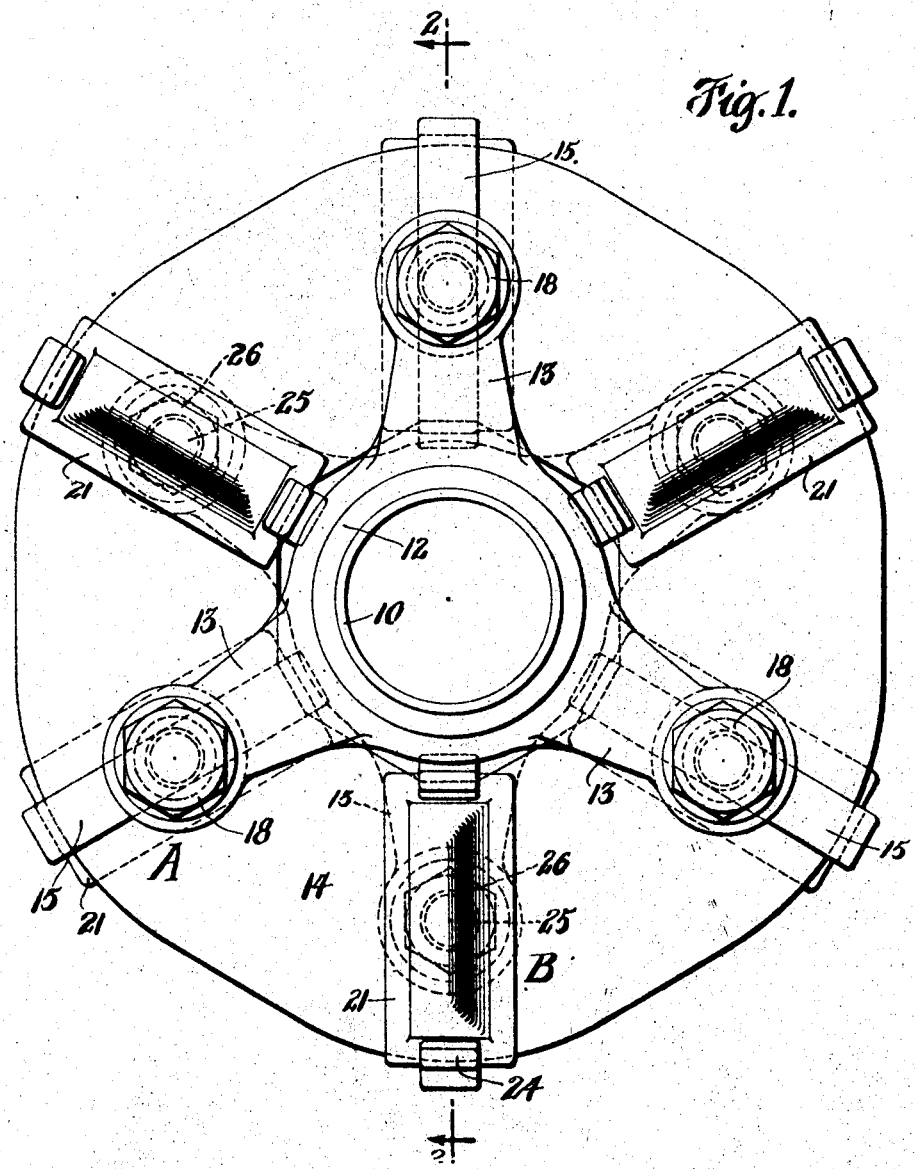

Feb. 5, 1924.

H. P. MACDONALD
FLEXIBLE JOINT
Filed July 15, 1920

1,482,571

3 Sheets-Sheet 1

Feb. 5, 1924. 1,482,571
H. P. MACDONALD
FLEXIBLE JOINT
Filed July 15, 1920   3 Sheets-Sheet 2
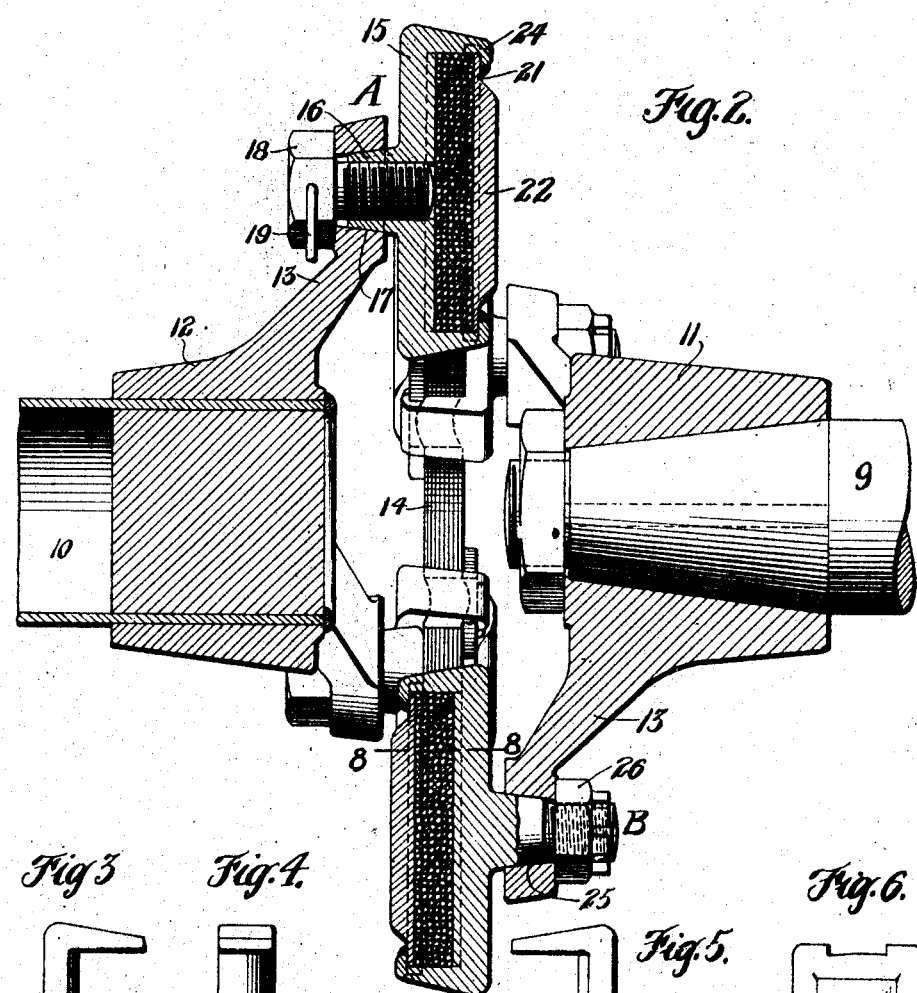
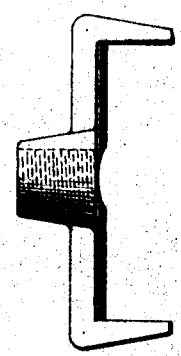
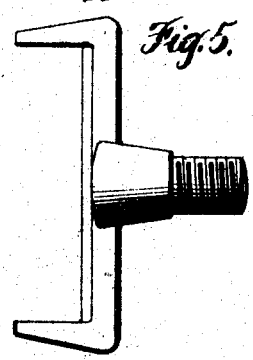

Feb. 5, 1924.
H. P. MACDONALD
FLEXIBLE JOINT
Filed July 15, 1920   3 Sheets-Sheet 3
1,482,571
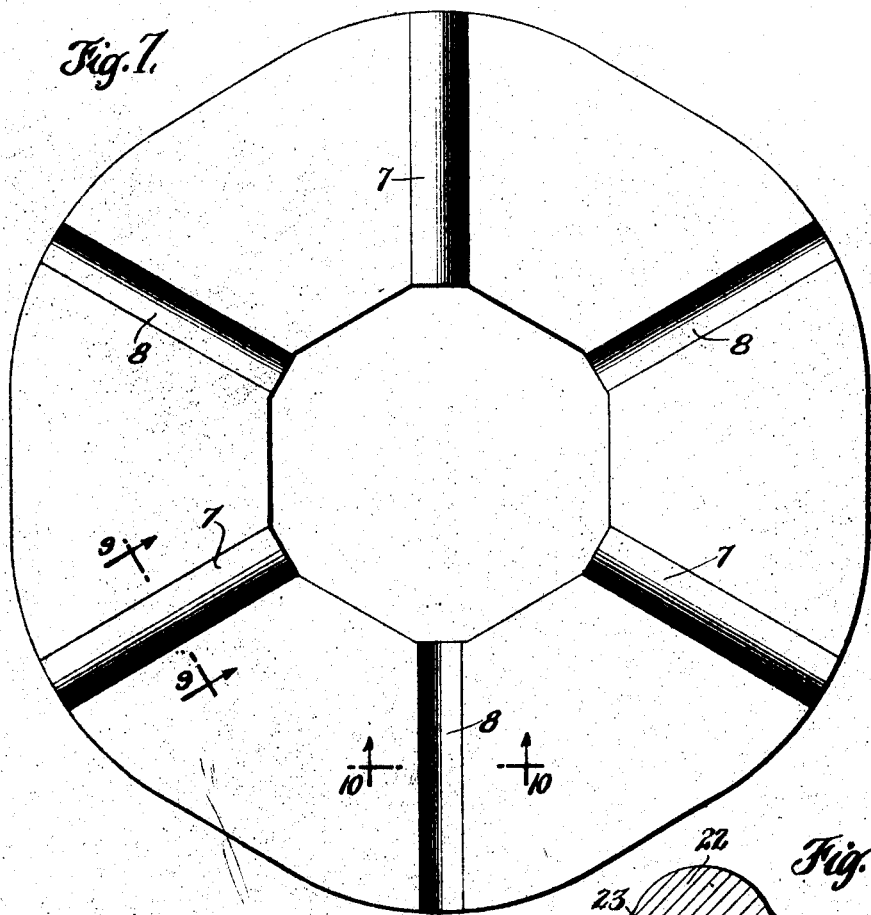
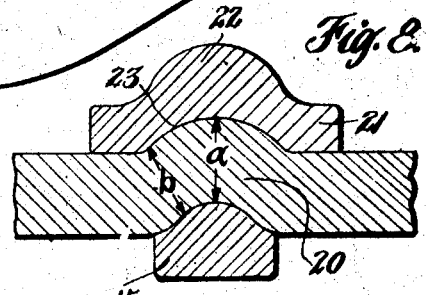
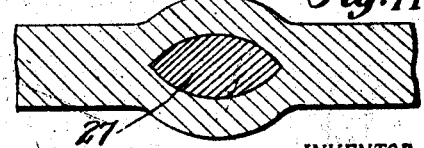

Patented Feb. 5, 1924.

1,482,571

UNITED STATES PATENT OFFICE.

HARRY P. MACDONALD, OF MONTCLAIR, NEW JERSEY, ASSIGNOR TO SNEAD & COMPANY, A CORPORATION OF NEW JERSEY.

FLEXIBLE JOINT.

Application filed July 15, 1920. Serial No. 396,375.

*To all whom it may concern:*

Be it known that I, HARRY P. MACDONALD, a citizen of the United States, residing at Montclair, in the county of Essex and State of New Jersey, have invented certain new and useful Improvements in Flexible Joints (#724), of which the following is a specification.

This invention relates to flexible joints such as are used, for example, in torque transmission assemblies, of which the drive of an automobile is an instance.

One of the primary objects of the invention is the provision of an improved joint which greatly facilitates assemblage.

Another object of the invention has to do with the provision of improved means whereby an effective grip of the flexible elements or element is had for the transmission of torque without detracting from the strength of the disc.

Still another object of the invention resides in the provision of an improved arrangement of joint parts adaptable for use in connection with a flexible disc such as shown and described in my copending application Serial No. 396,374, filed July 15, 1920.

I accomplish the foregoing, together with such other objects as may hereinafter appear, by means of a construction which I have illustrated in preferred form in the accompanying drawings, wherein:

Figure 1 is a section through a shaft illustrating my improved joint in elevation; Figure 2 is a section taken on the line 2—2 of Figure 1; Figures 3 and 4 are respectively a side and end elevation of a detail of my invention; Figure 5 is a side elevation of another detail of my invention; Figure 6 is a plan view of a keeper forming part of the connecting means between the discs and adjacent metallic parts; Figure 7 is an elevation of one form of disc suitable for use in connection with a joint embodying my improvements; Figure 8 is an enlarged sectional view taken on the line 8—8 of Figure 2; Figure 9 is a section taken on the line 9—9 of Figure 7; Figure 10 is a section taken on the line 10—10 of Figure 7; and Figure 11 is a fragmentary section, drawn on an enlarged scale, and illustrating a modification of my invention.

Referring now to Figures 1 and 2 particularly, it will be seen that the reference number 9 indicates a driving or driven shaft; and the reference 10 a floating shaft; said shafts being respectively provided with a spider or equivalent member 11 and 12, and said spiders being provided with feet 13, preferably three in number. The flexible disc is indicated at 14, such disc being composed of rubberized fabric or rubberized cord,—preferably the latter rather than textile fabric. The disc is secured to the feet of the respective spiders by one set of clamping connecting devices A, connecting the disc to one spider, and by a corresponding set of devices B, connecting the disc to the other spider.

The disc 14 is preferably formed in the manner described in aforesaid copending application and is provided with offset portions, preferably in the nature of beads 7 and corresponding grooves or depressions 8, such portions being oppositely disposed alternately.

The clamping device A consists of a yoke-like member 15 having a hub portion 16 which is tapered on the exterior and is threaded on the interior, such hub fitting in the conical opening 17 formed in the spider feet 13. The clamping device is secured to the spider feet by means of stud 18, by means of which it may be tightly drawn home. The studs are locked in any preferred manner as by means of the wire 19. The base of the yoke 15 is rounded or beaded in cross section as indicated at 20 in Figure 8 to correspond to the curvature of the groove 8. A keeper 21 notched to fit the arms of the yoke serves to secure the yokes to the disc, the parts being assembled by applying pressure in an amount sufficient to secure a proper grip on the disc, as will further appear. The keeper, which is wider than the yoke, is strengthened by providing a rib 22 on its outer face, its inner face being grooved as at 23 to a curvature corresponding to that of the rib 7. While the parts are still under pressure the ends of the yoke arms are bent over as indicated at 24, such bent over portions, if desired, being welded to the keeper.

The clamping devices B in so far as their connection with the disc is concerned, are the same as those previously described but instead of having a hub 16, they are provided with a lug 25 which is tapered to fit the holes of the spider feet, the ends of the lugs being threaded for reception of a castellated nut 26 by means of which the clamps are drawn up tightly. The forking of the keepers 21 prevents the latter from shifting laterally with respect to the yokes.

The clamps B have a more simple form of connection with the spiders than the clamps A, but the utility of the arrangement will be clear from the following: The floating member 10, in automobile drives, is inserted between two shafts, one of which only, namely, shaft 9, is shown, these two shafts being mounted on the car, the one being the transmission shaft and the other the rear axle or driving shaft. The transmission shaft is relatively fixed and in most instances the driving shaft may vary somewhat in position owing to variations in the positions of the springs to which the rear axle is connected. Difficulties in assemblage are, therefore, frequently encountered and it will be seen that if the same form of connection employed in the clamps B were also employed for the clamps A, great difficulty would be encountered in inserting the floating member in the assembly. However, with all of the spiders in place, and with the discs connected to the spiders 11 by the clamps B, the floating member 10 with its spiders may be readily inserted by pressing back the flexible disc sufficiently to permit the relatively short hub member 16 to be passed into the holes in the spider feet of the spiders 12, after which the studs 18 are set in place to secure the parts. By this simple arrangement the difficulties in assemblage are overcome without the necessity of providing any special form of slip joint for the floating shaft itself.

In so far as the grip of the yoke and keeper on the disc is concerned, it will be noted that by molding the disc with off set portions corresponding to the configuration of the gripping element, a firm grip for the transmission of torque is secured on the spider with much less pressure than would otherwise be required, which is advantageous in that it reduces the tendency to crowd or squeeze out the material of the disc from beneath the gripping element and places the cord or fabric under a less degree of tension, all of which tends to prolong the life of the disc. Practically the full strength of the material is retained at the points of connection for the foregoing reasons and for the additional reason, that the lateral clamping elements are external of the disc and are held exteriorly of it, thereby avoiding the necessity of piercing the latter with bolt holes.

In order to still further insure proper torque transmitting connection between the clamping devices and the disc, I prefer to form the ribs 7 and depression 8 on radii such as will cause the distance marked $a$, in Figure 8, to be greater than the distance marked $b$, the effect of which on the grip will be readily understood. That is, to say, the grip of the jaws will compress the disc material and thus cause elements thereof to be displaced toward one another (circumferentially) in the general plane of the disc and of the clamped area. Also, it will be necessary for the disc to be more severely deformed (so as to "iron out" this local thickening as well as the radial crease at 7, 8) before slippage can occur.

In Figure 11 I have shown the disc as being formed with projections on each side, the same being formed by inserting plugs 27 in the disc during formation thereof. It will be understood that for this style of disc the yoke and keepers would be correspondingly modified. Here the devices or members 27 thus embedded in the thickness of the disc bodily deflect its material laterally outside the general plane of the disc, into the recesses of the connective clamps, giving rise to much the same action on the opposed protuberant compressible facial clamp seats as in the case of the concave-convex clamping walls molded in the disc of Figs. 8—10. Not only do the radially extending rigid, convex members 27 thus form ridges of corresponding form projecting beyond the space defined by the planes of the disc faces, but they naturally reinforce and strengthen these portions of the disc transversely to the line of torque.

I claim:

1. In a flexible joint, the combination of a spider having an aperture, a disc, and means connecting the disc to the spider including a sleeve-like portion fitting said aperture, together with a stud threaded in said sleeve.

2. In a flexible joint the combination of a spider having a tapered aperture, a flexible disc, and means for connecting said disc to the spider, including a tapered sleeve-like member fitting said tapered aperture and a member internally engaging the sleeve.

3. In a flexible joint the combination of a spider having a tapered aperture, a flexible disc, and means for connecting said disc to the spider, including a tapered sleeve-like member fitting said tapered aperture together with a stud threaded in said sleeve.

4. In a flexible joint, the combination with an apertured spider and a flexible disc, of connecting means attached to said disc and having a hub like portion fitting the spider aperture, and means internally engaging said hub for securing said connecting means to the spider independently of its attachment to the disc.

5. In a flexible joint, the combination with an apertured spider and a flexible disc, of connecting means attached to said disc and having a short sleeve like portion fitting the spider aperture, and means fitting the interior of said sleeve cooperating therewith to secure said connecting means to the spider.

6. In a flexible joint, the combination with an apertured spider and a flexible disc, of connecting means attached to said disc and having a hollow portion in the spider aperture, and means including a stud threaded in said hollow portion cooperating therewith to secure said connecting means to the spider independently of its attachment to the disc.

7. In a flexible joint, the combination of an apertured spider, a flexible disc, a clamp engaging and held laterally against said disc, exteriorly and without penetration thereof, and means projecting from said clamp adapted to be passed into the spider aperture.

8. In a flexible torque transmitting joint, the combination with an apertured spider and a flexible disc, of a clamp attached to said disc only externally engaging it, with means projecting from said clamp adapted to be passed into said aperture.

9. In a torque transmitting assembly, the combination of a shaft with a spider therefor, a floating member with a spider therefor, and a flexible unit interposed between said spiders having means for connection with the spider of said shaft and means for connection with the spider of said floating member, permitting assemblage of the unit as such with the other parts by lateral flexure thereof to bring connecting means and spider into interengagement.

10. In a torque transmitting assembly, the combination of a shaft, a spider therefor, a floating member, a spider therefor, a flexible unit interposed between said spiders having means for connection with the spider for said shaft, and having means for connection with the spider of said floating member, one of said means being short enough to permit assembly of the unit as such with the spiders by lateral flexure of the disc to bring connecting means and spider into interengagement.

11. A flexible unit for use in flexible joints comprising a flexible disc and a plurality of clamping devices therefor, alternately arranged on opposite sides thereof, one set of clamping devices having projecting portions for connection with the spider, and the other set having relatively short sleeve-like projections for connection with another spider, and holding means fitting within said sleeve-like projections.

12. A flexible unit for flexible joints comprising a flexible disc, and a plurality of clamping elements engaging said disc, arranged alternately on opposite sides thereof, one set of said clamping devices being provided with a threaded pin for engagement with the spider, and the other set being provided with an internally threaded sleeve projection and a threaded holding member engaging the sleeve.

13. In a torque transmitting flexible disc coupling, the combination with a compressible flexible disc, of connecting means comprising a pair of clamping jaws for gripping the disc between them adapted to displace elements thereof toward each other in the general plane of the clamped area.

14. In a flexible coupling, the combination with a flexible torque transmitting disc and connective means therefor including a recessed member, of a device embedded in the thickness of the disc deflecting its material into the recess of said member.

15. In a torque transmitting flexible coupling in combination, a flexible disc having protuberant compressible clamp seats on each face, the seats on one face being respectively opposite those on the other face, and clamping jaws pressing against said seats.

16. The combination in a universal joint of driving and driven members; a flexible disc including fabric formed with ridges projecting beyond the space defined by the plane of its faces adjacent its points of attachment to said members and extending substantially transverse to the line of torque; with rigid reinforcing members corresponding in form to said ridges.

17. The combination in a flexible coupling of spiders; at least one flexible disc; means including bolts for connecting said spiders to said disc; and means for reinforcing the disc adjacent the bolt holes including elements imbedded therein and bodily deflecting the material of said disc outside of the general plane thereof.

18. A flexible coupling including, in combination, a flexible disc having a concave-convex clamping wall molded therein.

19. In a torque transmitting joint, the combination of a disc, and a means for connecting the disc to an adjacent part including two members one having a substantially convex surface and the other a substantially concave surface arranged so that the distance between the surfaces is greater at the center than at the edge.

20. In a torque transmitting joint, the combination of a disc, and a means for connecting the disc to an adjacent part including two clamping members, one having a substantially convex surface and the other a substantially concave surface arranged so that the distance between the surfaces is greater at its center than at an edge, the clamps being elongated with their greatest dimension across the discs.

21. A torque transmitting joint comprising in combination a disc and clamping means only externally engaging the disc adapted to connect the discs to an adjacent part, said means being so shaped with relation to the disc that the latter cannot be slipped through the clamping means without deforming it from its original shape.

In testimony whereof I have hereunto signed my name.

HARRY P. MACDONALD.